United States Patent [19]

Horiuchi

[11] 3,903,325

[45] Sept. 2, 1975

[54] METHOD FOR MAKING AN EXTREMELY THIN SILICON OXIDE FILM

[75] Inventor: Masatada Horiuchi, Koganei, Japan

[73] Assignee: Hitachi, Ltd., Japan

[22] Filed: Aug. 21, 1972

[21] Appl. No.: 282,015

[30] Foreign Application Priority Data

Aug. 21, 1971 Japan ................................ 46-62893

[52] U.S. Cl. .................. 427/93; 427/255; 427/314; 427/399

[51] Int. Cl.$^{2}$.................... B44D 5/12; H01L 21/469

[58] Field of Search ....... 117/201, 118, 213, 106 A, 117/106 R

[56] References Cited

UNITED STATES PATENTS

| | | | |
|---|---|---|---|
| 3,093,507 | 6/1963 | Lander | 117/201 |
| 3,200,019 | 8/1965 | Scott | 148/188 |
| 3,298,875 | 7/1967 | Schink | 148/6.3 |
| 3,409,483 | 11/1968 | Watson | 117/201 |
| 3,446,659 | 5/1969 | Wisman | 117/201 |
| 3,518,115 | 6/1970 | Pammer | 117/213 |
| 3,556,841 | 1/1971 | Iwasa | 117/201 |

*Primary Examiner*—Michael F. Esposito
*Attorney, Agent, or Firm*—Craig & Antonelli

[57] ABSTRACT

Gaseous oxygen vaporized from a liquid oxygen cooled by a refrigerant, such as liquid nitrogen, having a boiling point lower than that of liquid oxygen is guided into an oxidizing furnace along with an inert carrier gas so as to form an extremely thin oxide film on the surface of a silicon substrate which is placed in said oxidizing furnace and maintained at a relatively high temperature.

20 Claims, 3 Drawing Figures

METHOD FOR MAKING AN EXTREMELY THIN SILICON OXIDE FILM

BACKGROUND OF THE INVENTION

1. Field of the Invention

This invention relates to a method for making an extremely thin and homogeneous silicon oxide film with high reproducibility on a silicon semiconductor substrate.

2. Description of the Prior Art

There are known various methods for forming an extremely thin insulating film on a silicon semiconductor substrate. Generally, a silicon oxide film formed by oxidizing a silicon substrate in an oxygen-containing high temperature atmosphere is found superior in insulation resistance, electrical stability and film homogeneity to the insulating films formed by other methods such as for example a vacuum evaporation method or an anode oxidation method. However, in attempting to form an extremely thin silicon oxide ($SiO_2$) film according to a conventional silicon oxide film forming method such as a high temperature oxidation method which is commonly used in manufacture of semiconductors, it has been found that it takes about 2 minutes for forming a $SiO_2$ film of 100 A thickness at oxidizing temperature of 1,000°C. and only 18 seconds for forming a 30 A thick film, and hence it is hardly possible to obtain $SiO_2$ films of a desired thickness with high reproducibility. Therefore, in order to form an extremely thin $SiO_2$ film with excellent reproducibility according to a thermal oxidation method, the procedure employed needs to excessively but controllably reduce the $SiO_2$ film forming speed so as to provide an ample time to be spent for the film forming. Various attempts have been made in the past to solve this problem—such as a proposed method in which partial pressure of oxygen is reduced by diluting oxygen with an inert gas such as nitrogen or argon gas, or a method in which oxidation is carried out at a low temperature of less than 600°C. by using a normal thermal oxidation method.

However, the former method is accompanied with a defect that the reproducibility of the formed film thickness depends greatly on fluctuation of the flow rate of oxygen and its carrier gas which is an inert gas, that is, on the performance of the flow meter. On the other hand, according to the latter method which uses low temperature oxidation techniques, although it is possible to form a thin $SiO_2$ film of a desired thickness with good reproducibility, it is well known that there exists an intimate corelation between the surface state density at the Si-$SiO_2$ interface and the oxidizing temperature as further discussed later, that is, the surface state density tends to be increased as the oxidizing temperature decreases. Increase of this surface state density worsens the noise characteristic, transmission conductance, current amplification coefficient and other properties of semiconductor elements using mainly the surfaces of semiconductors such as MOS type field effect transistors, planar type diodes and transistors, or their integrated circuits and large scale integrated circuits. Therefore, use of the low temperature oxidation method is not recommendable where these elements using the semiconductor surfaces are involved.

SUMMARY OF THE INVENTION

The object of the present invention is to provide a method for forming an extremely thin $SiO_2$ film with high reproducibility on the surface of a silicon semiconductor, whereby the surface state density developed at the Si-$SiO_2$ interface is appreciably reduced as compared with those produced in the conventional methods.

In order to accomplish the above and other objects, there is provided according to the present invention an improved film forming method characterized in that oxygen at the boiling temperature (−196°C.) of a refrigerant, such as liquid nitrogen, having a boiling point lower than that of liquid oxygen is used as the source for oxidation, and this oxygen is introduced into an oxidation furnace with an inert gas such as nitrogen gas. By so doing, the partial pressure of the oxygen introduced into the oxidation furnace can be kept substantially constant at 150 mmHg, making it possible to form an extremely thin $SiO_2$ film with good reproducibility in a same high temperature atmosphere as used ordinarily in making a thick $SiO_2$ film. Further, since the $SiO_2$ film thus formed is a high temperature oxidation film, it is possible to reduce the surface state density at the Si-$SiO_2$ interface.

In order to further clarify the salient features and effects of the present invention, detailed description of preferred embodiments of the invention will be given hereinbelow with reference to the accompanying drawings.

DESCRIPTION OF THE PREFERRED EMBODIMENTS

Figure 1:
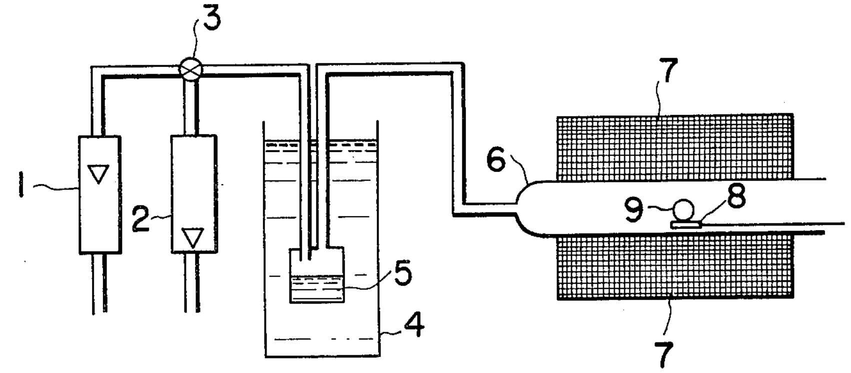
FIG. 1 is a schematic arrangement illustrating one form of the apparatus used for forming an extremely thin $SiO_2$ film according to the method of the present invention.

Referring to FIG. 1 of the drawings, reference number 1 designates a flow meter adapted to control the flow rate of inert gas used as carrier gas, and 2 a flow meter for adjusting the flow rate of oxygen supplied to a trap 5 until a predetermined amount of liquid oxygen is accumulated in said trap. When a predetermined amount of liquid oxygen is formed in the trap 5, a three-way valve 3 is operated to close the flow meter 2, allowing only the carrier gas to flow. Numeral 4 indicates a refrigerant, such as for example liquid nitrogen, the boiling point of which is lower than 183°. A pipe 6 is provided which is made of, for instance, quartz and adapted to guide the oxygen molecules carried on the carrier gas to a specimen 9, a high temperature furnace 7, and a jig 8 made of, for instance, quartz and designed to set the specimen 9 at a predetermined position in the furnace 7. For producing best performance in practicing the method of the present invention, it is preferred to narrow the outlet of the quartz pipe 6 so as to prevent back flow of atmospheric air.

Figure 2:
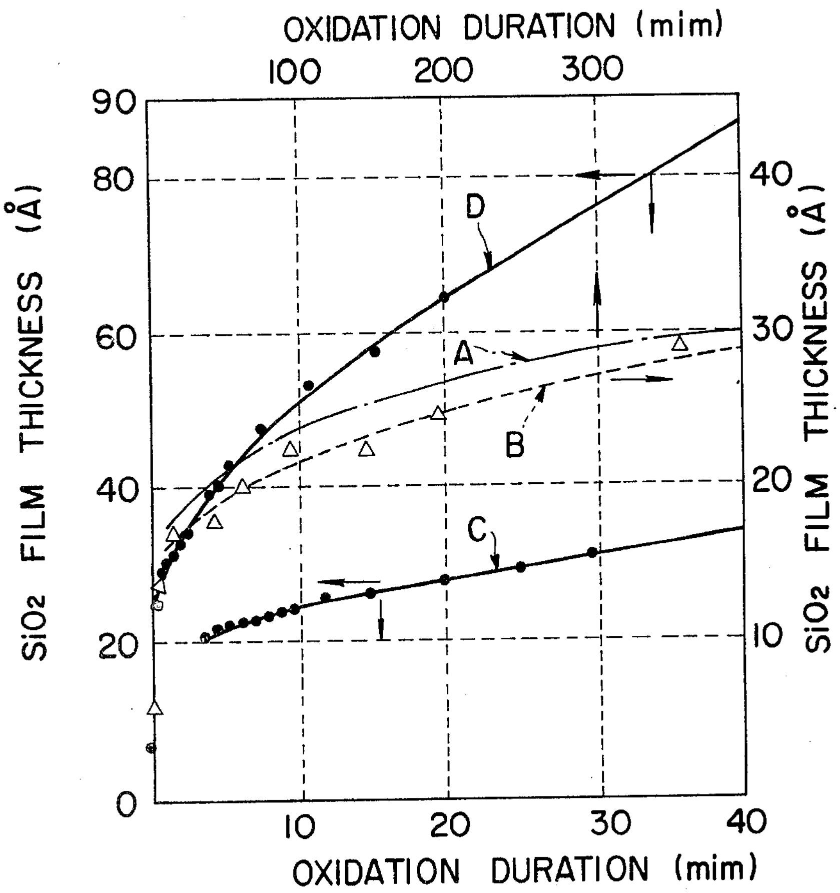
FIG. 2 is a graph showing the dependency of $SiO_2$ film thickness on oxidation duration, wherein the results from the examples of the present invention are compared with those from a conventional method.

FIG. 2 shows data obtained from determining the relationship between oxidation duration in minutes (abscissa) and formed $SiO_2$ film thickness (ordinate) for facilitating the comparison between the conditions for forming an extremely thin $SiO_2$ film in a high temperature atmosphere according to the method of the present invention and the conditions for forming an extremely thin $SiO_2$ film at a low temperature according to a prior art method.

A polarization analyzer (ellipsometry) was used for measuring the extremely thin $SiO_2$ film. It is possible with such ellipsometry to measure both the oxide film thickness and the refractive index at the same time. It was found that the extremely thin oxide film formed in a high temperature atmosphere according to the method of the present invention has a refractive index of 1.45 to 1.47 when the oxide film thickness is about 100 A. It was also ascertained that such oxide film is composed optically of silicon dioxide ($SiO_2$).

Curve A in FIG. 2 represents the relationship between $SiO_2$ film thickness (graduation on the right side of the graph) and oxidation duration (graduation on top of the graph) as observed under the $SiO_2$ film forming conditions according to the conventional low temperature oxidation method. Oxidizing temperature was 600°C.

Curve B explains the relationship between $SiO_2$ film thickness (graduation on the right side) and oxidation duration (graduation on top) as observed under the $SiO_2$ film forming conditions according to the method of the present invention at the oxidizing temperature of 700°C. Curves C and D show the relationship between $SiO_2$ film thickness (graduation on the left side) and oxidation duration (graduation at the bottom) as seen under the $SiO_2$ film forming conditions according to the method of the present invention at the oxidizing temperature of 900°C. and 1,100°1,100°respectively. It will be understood that the oxidizing temperature is normally in excess of 1,000°C.

Among the known methods for forming an extremely thin $SiO_2$ film, the low temperature oxidation method is considered best in respect of reproducibility. However, as apparent from FIG. 2, the method according to the present invention can not only compare favorably with said best prior art method in reproducibility but is also capable of forming an extremely thin $SiO_2$ film at a high temperature.

In the experiments illustrated in FIG. 2, a silicon substrate having a specific resistance of 22.6 to 23.5Ω-cm at the P type (100) plane was used as specimen and nitrogen gas was used as carrier gas by feeding it at a flow rate of 1 l/min.

In an alternative embodiment of the present invention helium gas, which is an inert gas, was used as carrier gas in place of nitrogen gas and the experiment was conducted under the same conditions as in the case of nitrogen gas to obtain the same results. Other inert gases such as argon or neon gas could also produce similar effects.

Now, the preferred applications for use of the thin silicon oxide film obtained from the method of the present invention will be further described.

Figure 3:
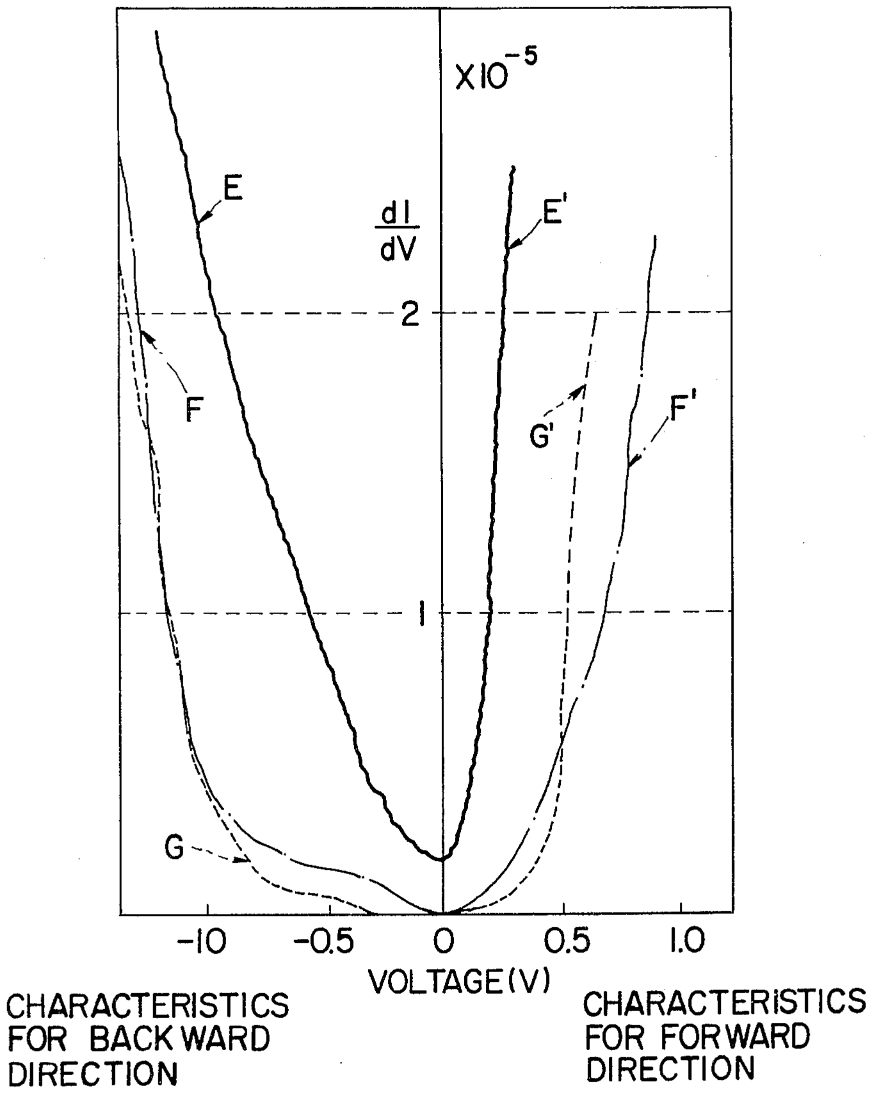
FIG. 3 is a graph showing the relationship between AC differential conductance and applied voltage, illustrating still another embodiment of the present invention wherein the method of the present invention forms an extremely thin $SiO_2$ film designed particularly for use in an MOS type tunnel diode.

FIG. 3 shows the results of measurement of the tunnel characteristics of an MOS (metal-oxide-Si) type diode which was prepared by forming a 30 A thick $SiO_2$ film by oxidizing a silicon substrate of a $P^{++}$ type (111) plane with specific resistance of 0.002 Ω-cm according to the method of the present invention and then forming a 1 mm-diameter aluminum electrode thereon by a vacuum evaporation method. In FIG. 3, the ordinate is measured as differential conductance (dI/dV) of the AC component and the abscissa as DC voltage (V) applied to the aluminum electrode. Curve E expresses the characteristics of the specimen formed with a $SiO_2$ film at oxidizing temperature of 700°C. and duration of 360 minutes, curve F represents the characteristics of the specimen formed with a $SiO_2$ film at 900°C. oxidizing temperature, and duration of 25 minutes, and curve G indicates the characteristics of the specimen formed with a $SiO_2$ film at 1,100°C. oxidizing temperature and duration of 2 minutes. In these experiments, nitrogen gas was used as carrier gas with its flow rate being kept constant at 1 l/min. throughout the film forming operation.

For determining the differential conductance of the AC component, a small constant AC voltage (5 mV) was added to the DC voltage to be applied to the specimen and the differential conductance of the AC component flowing through the specimen was detected by a phase sensitive detector. The relationship between differential conductance and applied voltage was determined by very slowly changing the impressed DC component and directly registering on an X-Y recorder. The frequency of the small constant AC voltage to be added to said DC applied voltage was kept constant at 10.2 Hz. It will be appreciated that if the frequency of said small AC voltage is too high, the susceptance (reciprocal of conductance) component of the admittance becomes not negligibly large and, consequently, this may cause deviation from the differential conductance of the DC component. Therefore, it needs to use an AC voltage of as low frequency as possible.

As is well known, in the differential conductance (dI/dV) - applied voltage (V) characteristics of the tunnel current in an MOS type structure using a $P^+$ type silicon substrate in a degenerated state, the so-called characteristics for backward direction (that is to say, the characteristics observed when a negative voltage is impressed to the metal electrode) have close relation with the electric characteristics of the insulating film silicon surface, particularly with the energy distribution in the forbidden band of the surface level and its density.

In FIG. 3, it can be considered that O V of the applied voltage represents the valence band edge of silicon at the $SiO_2$-Si interface, −1.12 V represents the conduction band edge, and the middle point thereof corresponds to the energy level at the forbidden band gap. Also, the differential conductance of the backward direction characteristics corresponding to the energy level of the forbidden band has a relation of monotone increase with the surface state density at the Si-$SiO_2$ interface. Thus, from comparison of the characteristic E of the specimen treated at oxidizing temperature of 700°C., characteristic F of the specimen treated at 900°C. oxidizing temperature and characteristic G of the specimen treated at 1,100°C. oxidizing temperature in FIG. 3, it is noticed that the surface state density has a tendency to decrease as the oxidizing temperature is increased. From this fact, it is apparent that, in forming an extremely thin $SiO_2$ film, the method of the present invention in which the silicon substrate is oxidized at a high temperature is far superior in the electric characteristics of the semiconductor surface to the prior art method in which oxidation is effected at a low temperature of below 600°C.

The invention has been described by way of an embodiment thereof in which, for forming an extremely thin $SiO_2$ film by oxidizing silicon in an oxygen-containing high temperature atmosphere, the oxygen vaporized under vapor pressure of oxygen at the boiling temperature of liquid nitrogen is used as source for oxidation, but according to the general principles of the present invention, the refrigerant used for controlling the vapor pressure of oxygen serving as a source for oxidation is not restricted to liquid nitrogen; it is contemplated to use other types of refrigerant provided that each has a boiling point lower than that of liquid oxygen. Among the refrigerants that meet such condition are, for instance, liquid argon, liquid neon, liquid helium and the like.

The salient features and effects of the method of the present invention will be apparent from the foregoing explanation, but it should be also pointed out that the effects of the present invention are not limited to the semiconductor devices of a structure consisting of a silicon substrate, an extremely thin $SiO_2$ film and an electrode metal. The above-described effects of the present invention are also manifested in other types of semiconductor devices such as for example the elements of a type that is constituted by first forming an extremely thin $SiO_2$ film on a silicon substrate according to the method of the present invention, then depositing another insulating film on said $SiO_2$ film and then forming an electrode metal, or the elements of a so-called floating gate structure constituted by forming an extremely thin metal film or semiconductor film on an extremely thin $SiO_2$ film formed by the method of the present invention, then further laying an insulating film on said extremely thin metal or semiconductor film, and thereafter forming an electrode metal, or the tunnel elements of a so-called SIS (Si-insulator-Si) structure constituted by forming an extremely thin $SiO_2$ film on a silicon substrate according to the method of the present invention and then forming a semiconductor film so that a tunnel current will flow through the extremely thin $SiO_2$ film between said silicon substrate and said semiconductor. Thus, the present invention is extremely useful in the field of manufacture of semiconductor devices and small-sized circuit devices such as integration circuits or large-scale integrating circuits.

While the novel principles of the invention have been described, it will be understood that various omissions, modifications and changes in these principles may be made by one skilled in the art without departing from the spirit and scope of the invention.

What is claimed is:

1. A method for forming an extremely thin silicon oxide film comprising the following steps:

1. retaining liquid oxygen at the boiling point temperature of a refrigerant having a boiling point lower than that of said liquid oxygen;
2. diluting the oxygen vaporized from said liquid oxygen with an inert carrier gas; and
3. heating a silicon substrate to a high temperature; and contacting said oxygen-containing carrier gas with said silicon substrate so as to form a silicon oxide film on said silicon substrate.

2. A method for forming an extremely thin silicon oxide film according to claim 1, wherein said refrigerant is selected from the group consisting of liquid nitrogen, liquid argon, liquid neon and liquid helium.

3. A method for forming an extremely thin silicon oxide film according to claim 1, wherein said carrier gas is selected from the group consisting of nitrogen and argon.

4. A method for forming an extremely thin silicon oxide film according to claim 1, wherein said high temperature is at least 900°C.

5. A method for forming an extremely thin silicon oxide film according to claim 1, wherein said silicon oxide film on said silicon substrate has a thickness less than 90 A.

6. A method for forming a silicon oxide film on a silicon substrate comprising:

contacting a carrier gas with liquid oxygen to form a gaseous oxygen-containing carrier gas heating a silicon substrate to a temperature sufficient to yield a silicon oxide film with a surface state density of acceptable noise characteristics, and contacting said gaseous oxygen-containing carrier gas with said silicon substrate to form a silicon oxide film on said silicon substrate at said temperature, which silicon oxide film is highly reproducible.

7. A method according to claim 6, wherein said liquid oxygen is retained at a substantially constant temperature.

8. A method according to claim 6, wherein said liquid oxygen is substantially retained at the boiling point temperature of a refrigerant having a boiling point lower than that of said liquid oxygen to maintain the partial pressure of the oxygen substantially constant.

9. A method according to claim 6, wherein said carrier gas is inert.

10. A method according to claim 8, wherein said refrigerant is selected from the group consisting of liquid nitrogen, liquid argon, liquid neon and liquid helium.

11. A method according to claim 9, wherein said carrier gas is selected from the group consisting of nitrogen and argon.

12. A method according to claim 6, wherein said silicon substrate is heated to a temperature of at least 900° C.

13. A method according to claim 6, wherein said silicon oxide film on said silicon substrate has a thickness less than 90 A.

14. A method according to claim 6, wherein said silicon substrate is heated to a temperature of 700°C.

15. A method according to claim 6, wherein said silicon substrate is heated to a temperature of 1,100°C.

16. A method according to claim 6, wherein said silicon substrate is heated to a temperature of at least 1,000°C.

17. A method according to claim 8, wherein the partial pressure of the oxygen is maintained substantially at 150 mm Hg.

18. A method according to claim 17, wherein said refrigerant is liquid nitrogen having a boiling temperature lower than −183°C.

19. A method according to claim 18, wherein said inert gas is nitrogen gas.

20. A method according to claim 19, wherein said temperature to which said substrate is heated is in excess of 1,000°C.

* * * * *